US009535772B2

(12) United States Patent
Warkentin et al.

(10) Patent No.: US 9,535,772 B2
(45) Date of Patent: Jan. 3, 2017

(54) CREATING A COMMUNICATION CHANNEL BETWEEN DIFFERENT PRIVILEGE LEVELS USING WAIT-FOR-EVENT INSTRUCTION IN SYSTEMS OPERABLE AT MULTIPLE LEVELS HIERARCHICAL PRIVILEGE LEVELS

(71) Applicant: VMware, Inc., Palo Alto, CA (US)

(72) Inventors: Andrei Warkentin, Wakefield, MA (US); Harvey Tuch, Cambridge, MA (US)

(73) Assignee: VMware, Inc., Palo Alto, CA (US)

( * ) Notice: Subject to any disclaimer, the term of this patent is extended or adjusted under 35 U.S.C. 154(b) by 35 days.

(21) Appl. No.: 14/572,516

(22) Filed: Dec. 16, 2014

(65) Prior Publication Data

US 2016/0170816 A1    Jun. 16, 2016

(51) Int. Cl.
*G06F 9/00* (2006.01)
*G06F 9/54* (2006.01)
*G06F 9/455* (2006.01)

(52) U.S. Cl.
CPC ........... *G06F 9/544* (2013.01); *G06F 9/45558* (2013.01); *G06F 2009/45591* (2013.01)

(58) Field of Classification Search
CPC ............. H04L 63/0227; H04L 63/1408; H04L 63/1416; H04L 63/1145; G06F 21/554; G06F 21/566; G06F 21/52; G06F 21/53; G06F 21/564
USPC .............................................................. 726/5
See application file for complete search history.

(56) References Cited

U.S. PATENT DOCUMENTS

| 5,524,250 A   | * | 6/1996  | Chesson | G06F 9/3851  |
|               |   |         |         | 712/228      |
| 8,448,165 B1  | * | 5/2013  | Conover | G06F 9/45558 |
|               |   |         |         | 717/174      |
| 9,038,176 B2  | * | 5/2015  | Sallam  | G06F 21/554  |
|               |   |         |         | 718/1        |
| 2012/0254995 A1 | * | 10/2012 | Sallam | G06F 21/554 |
|               |   |         |         | 726/22       |

OTHER PUBLICATIONS

Technical Reference Manual ; ARM® Cortex®-A57 MPCore™ Processor; Revision: r1p0; 2013.*
Non-Final Office Action dated Dec. 15, 2015 in related U.S. Appl. No. 14/572,511.

* cited by examiner

*Primary Examiner* — Samson Lemma

(57) ABSTRACT

In a computer system operable at multiple hierarchical privilege levels, a "wait-for-event" (WFE) communication channel between components operating at different privilege levels is established. Initially, a central processing unit (CPU) is configured to to "trap" WFE instructions issued by a client, such as an operating system, operating at one privilege level to an agent, such as a hypervisor, operating at a more privileged level. After storing a predefined special sequence in a storage component (e.g., a register), the client executes a WFE instruction. As part of trapping the WFE instruction, the agent reads and interprets the special sequence from the storage component and may respond to the special sequence by storing another special sequence in a storage component that is accessible to the client. Advantageously, the client may leverage this WFE communication channel to establish low-overhead watchdog functionality for the client.

14 Claims, 4 Drawing Sheets

CREATING A COMMUNICATION CHANNEL BETWEEN DIFFERENT PRIVILEGE LEVELS USING WAIT-FOR-EVENT INSTRUCTION IN SYSTEMS OPERABLE AT MULTIPLE LEVELS HIERARCHICAL PRIVILEGE LEVELS

CROSS-REFERENCE TO RELATED APPLICATION(S)

This application is related to U.S. patent application Ser. No. 14/572,511, entitled "Safely Discovering Secure Monitors and Hypervisor Implementations in Systems Operable at Multiple Hierarchical Privilege Levels" which is assigned to the assignee of this application and have been filed on the same day as this application, and the entire contents of which are incorporated by reference herein.

BACKGROUND

The ARM® 64-bit processor systems are operable at multiple hierarchical privilege levels. Typically, such systems execute user applications at a lowest privilege level, known as exception level 0 (EL0), and execute system code at three increasingly higher privilege levels, known as EL1, EL2, and EL3. For example, operating system code may execute at EL1, hypervisor code at EL2, and secure monitor code at EL 3.

In general, operating systems and hypervisors use "secure monitor calls" (SMCs) to communicate with secure monitors—code that executes in a secure mode intended to mitigate security concerns (e.g., confidentiality, integrity, authenticity, etc.). Similarly, in systems where an operating system (OS) is running in a virtual machine (VM) under a hypervisor, the OS uses "hypervisor calls" (HVC), also known as hyper calls, to communicate with the hypervisor. However, secure monitor and hypervisor implementations as well as the corresponding SMC and HVC interfaces may vary dramatically across systems. For instance, in some systems, the secure monitor code and SMC interface provide a trusted computing base. In other systems, the secure monitor code and SMC interface provide debugging facilities. Yet other systems do not include any secure monitor code.

In operation, if an OS or a hypervisor issues a SMC or HVC that is not exposed by a corresponding interface, then undesirable behavior, such as a system crash occurs. Consequently, various techniques are employed to detect the presence and type of SMC and HVC implementations before issuing SMC or HVC calls, such as out-of-band methods. However, out-of-band methods typically rely on implementation-specific details for secure monitors, hypervisors, and/or virtual machine and accesses to nonexistent implementation-specific features, such as registers, may cause unrecoverable failures. Consequently, a more flexible and robust strategy for detecting hypervisor and secure monitor implementations is desirable.

SUMMARY

One or more embodiments leverage a wait-for-event instruction (WFE) based communication channel to exchange data between components operating at different privilege levels in a computer system. According to embodiments, a client writes transmission data to a general-purpose CPU register (GPR) accessible to both the client and an agent, the client issues a wait-for-event instruction that is trapped into the agent, the agent reads the data, and the agent writes response data to the system register. a storage location accessible to both the client and an agent. In alternate embodiments, the GPR may be replaced with any storage location that is accessible to both the client and the agent.

In a computer system operating at a first privilege level, a method of detecting an agent operating at a second privilege level that is a higher privilege level than the first privilege level, where the agent is configured to trap wait-for-event (WFE) instructions generated at the first privilege level, according to one embodiment, includes the steps of storing a value in a first memory component that is accessible by the agent to indicate to the agent that the WFE instruction is intended to detect the agent; executing one or more WFE instructions; and in response to a notification of successful completion of the WFE instructions, reading a second memory component in which the agent, in response to the WFE instructions, is to store a value indicating that the agent is present, and determining whether the agent is present based on the value stored in the second memory component.

In a computer system operating at an agent privilege level, a method of communicating with a client operating at a client privilege level that is at a lower privilege level than the agent privilege level, according to one embodiment, includes the steps of setting a control register to trap wait-for-event instructions that are generated by the client; trapping a wait-for-event instruction based on the control register; and upon trapping the wait-for-event instruction, reading a value stored in a first memory component, executing one or more instructions based on the stored value, and returning execution control to the client.

In the embodiments, the client capitalizes on the WFE-based communication channel to flexibly and efficiently access agent capabilities. Advantageously, the client may employ the WFE-based communication channel to detect whether an agent is present without executing calls, such as hypervisor or secure monitor calls, which cause a crash or other undesirable behavior when the corresponding agent is not present. Further, the client may leverage the WFE-based communication channel to establish watchdog functionality for systems that do not include watchdog functionality, or provide low-overhead watchdog functionality for virtual machines.

DETAILED DESCRIPTION

Figure 1:
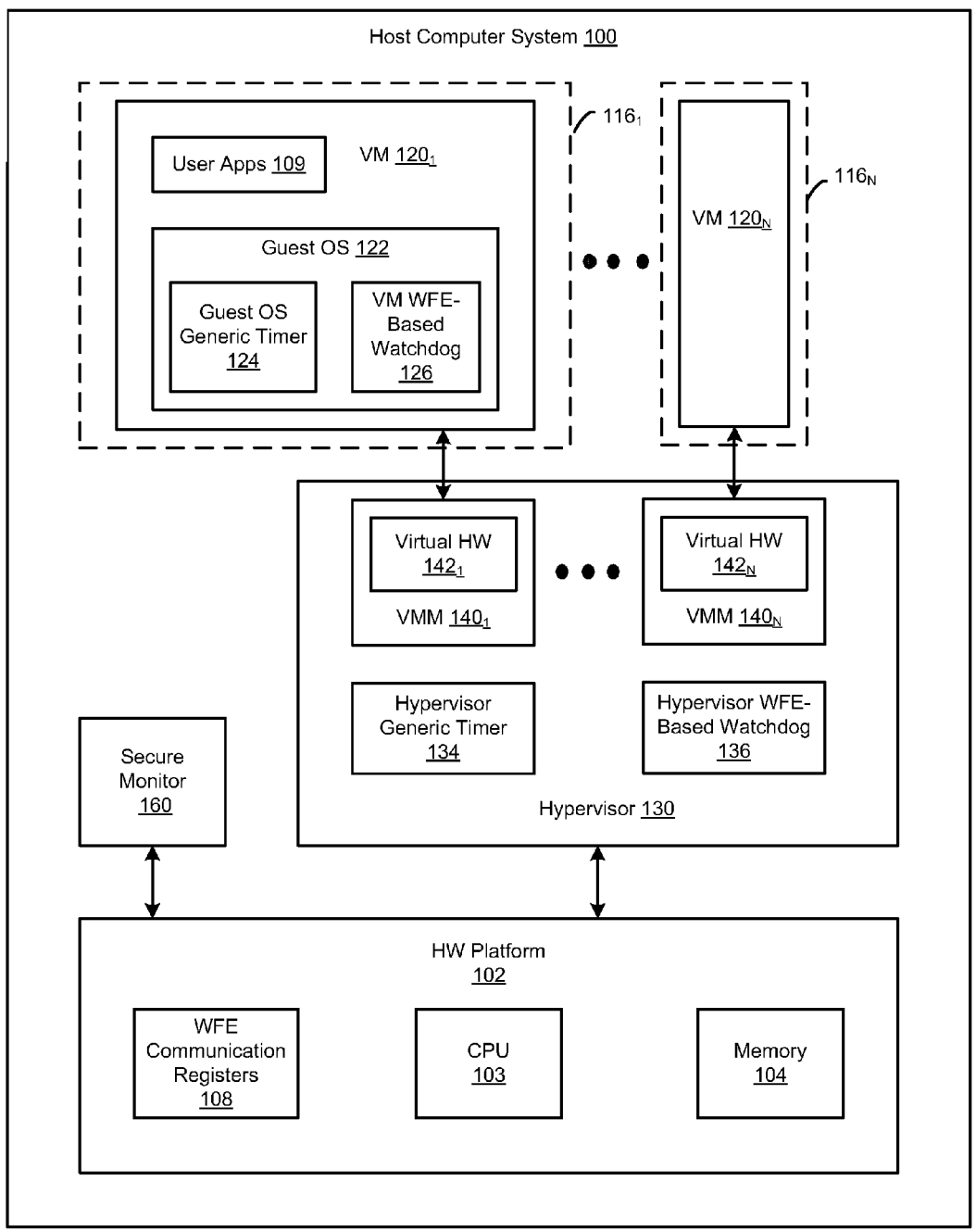
FIG. 1 is a block diagram of a host computer system that is configured to establish a communication channel between components operating at different privilege level using a wait-for-event instruction, according to one or more embodiments.

FIG. 1 is a block diagram of a host computer system 100 that is configured to establish a communication channel between components operating at different privilege level using a wait-for-event (WFE) instruction, according to one or more embodiments. Host computer system 100 may be constructed on a desktop, laptop, mobile, tablet or server grade hardware platform 102. Hardware platform 102 includes one or more central processing units (CPU) 103, host physical memory 104, and other standard hardware components such as network interface controllers (not shown) that connect host computer system 100 to a network.

In operation, CPU 103 executes software at different privilege levels, where each privilege level imposes a set of constraints and provides a set of functionality (such as access to specific registers and address translation mechanisms). For example, user applications 109 typically execute at a relatively low privilege level that precludes processes from executing instructions that could damage or compromise host computer system 100. In the embodiment illustrated in FIG. 1, hardware platform 102 supports four hierarchical privilege levels and an exception mechanism for transitioning execution between these privilege levels. It should be understood that, hardware platforms of other embodiments may support less than or more than four hierarchical privilege levels. From least to most privileged, the privilege levels are: exception level 0 (EL0), EL1, EL2, and EL3. On taking an exception, the privilege level either increases or remains the same. By contrast, on returning from an exception, the exception level either decreases or remains the same. Hardware platform 102 supports a variety of types of exceptions that may differ in semantics and nomenclature. Some types of exceptions are referred to as "system monitor calls," "interrupts," "hypervisor calls," and "faults."

Upon power-up of hardware platform 102, platform firmware executes in "secure mode" (i.e., at the highest privilege level—EL3) and then transitions hardware platform 102 to non-secure mode (a lower privilege level). As part of the power-up process, platform firmware performs various initializations functions such as installing security measures, installing a secure monitor 160, and installing a hypervisor 130. In various embodiments, the functionality of platform firmware, and/or hypervisor 130 may be consolidated into a single unit or distributed into additional units.

As shown, secure monitor 160 is installed on top of hardware platform 102. CPU 103 executes secure monitor 160 at the highest privilege level—EL3. Often, implementations of secure monitor 160 are used to mitigate security concerns (e.g., confidentiality, integrity, authenticity, etc.). However, the functionality provided by secure monitor 160 may vary dramatically between host computer systems 100 and may include any code that leverages functionality that exploits capability unavailable in non-secure mode. For instance, in some systems, the secure monitor provides a trusted computing base. In other systems, the secure monitor code provides debugging facilities. Alternate embodiments do not include secure monitor 160.

Hypervisor 130 is also installed on top of hardware platform 102, and CPU 103 executes hypervisor 130 at EL2. Hypervisor 130 provides operating system functionality (e.g., process creation and control, file system, process threads, etc.) as well as CPU scheduling and memory scheduling across multiple virtual machine (VM) execution spaces $116_1$-$116_N$ within hypervisor 130. Within each VM execution space $116_1$-$116_N$, a VM process is executed to instantiate corresponding VMs $120_1$-$120_N$, and virtual machine monitors (VMM) $140_1$-$140_N$ implement the virtual system support needed to coordinate operations between hypervisor 130 and their respective VMs $120_1$-$120_N$. Alternate embodiments include hypervisors 130 that implement any type of behavior specified by code executing at EL2, including different types of virtual system support and functionality other than virtual system support. Yet other alternate embodiments do not include hypervisor 130.

As shown, each VMM $140_1$-$140_N$ manages a corresponding virtual hardware platform (i.e., virtual hardware platforms $142_1$-$142_N$) that includes emulated hardware such as virtual CPUs (vCPUs) and guest physical memory. Each virtual hardware platform 142 supports the installation of a guest operating system (OS) 122 that operates at EL1. In each instance, guest OS 122 provides user applications 109 running in the virtual machine an interface to the virtual hardware platform of the virtual machine. User applications 109 typically operate at the lowest privilege level—EL0.

In general, guest OS 122 and hypervisor 130 use "secure monitor calls" (SMCs) to communicate with secure monitors 160. Similarly, guest OS 122 uses "hypervisor calls" (HVC), also known as hypercalls, to communicate with hypervisor 130. However, secure monitor 160 and hypervisor 130 implementations as well as the corresponding SMC and HVC interfaces may vary dramatically across computer systems. Further, in various embodiments the host computer system 100 omits secure monitor 160 and/or hypervisor 130.

In operation, if guest OS 122 or hypervisor 130 issues an SMC or HVC that is not exposed by a corresponding interface, then undesirable behavior, such as a system crash occurs. For this reason, embodiments provide a "safe" technique to detect the presence and type of secure monitor 160 and/or hypervisor 130 implementations. After verifying the existence of secure monitor 160 or hypervisor 130, guest OS 122 and hypervisor 130 may tailor SMC and/or HVC calls to ensure that such calls comply with the exposed interface—safely using functionality included in secure monitor 160 and/or hypervisor 130.

For explanatory purposes, the terms "client" and "agent" are used herein to capture the relationship between code executing at a client exception level and code executing at an agent exception level that is more privileged than the client exception level. For example, "client" guest OS 122 and "client" hypervisor 130 typically use SMCs to communicate with "agent" secure monitor 160. Similarly, "client" guest OS 122 typically uses HVCs to communicate with "agent" hypervisor 130. Notably, in one context, hypervisor 130 acts as a client and in a different context, hypervisor 130 acts as an agent.

Irrespective of the types of clients and agents, the agent detection technique outlined herein leverages on the agent trapping a "wait-for-event" (WFE) instruction issued by the client. Conventionally, a WFE instruction "blocks" execution of the following instruction at the issuing privilege level until an "event" occurs. Such events include, without limitation, unmasked CPU interrupts, certain activity on other CPUs 130 in a symmetric multiprocessor configuration, and a CPU-local timer event stream that is generated by a generic timer.

In host computer system 100, before executing client code, the agent configures an agent control register to cause CPU 103 to trap to the agent on a WFE instruction issued by the client. To enable the agent to distinguish between "conventional" WFE instructions and WFE instructions intended for agent discover purposes, the client sets the values of one or a WFE communication register 108 (e.g., designated system register) included in HW platform 102 to a predetermined "special" sequence. In alternate embodiments, the client may communicate intentions to the agent via any number of WFE communication registers 108 and/or any number of other storage components that are accessible to the agent as well as the client, such as designated locations in a memory 104.

Upon detecting a WFE instruction, the agent reads the values from WFE communication register 108 to determine whether the WFE instruction is intended for agent discovery purposes. If the WFE instruction is intended for agent discovery purposes, then the agent responds by setting the value of WFE communication register 108 to indicate that the agent exists. If the WFE instruction is not intended for agent discovery purposes, then the agent emulates the expected behavior—executing a conventional WFE.

After the WFE event completes, the client determines whether WFE communication register 108 indicates that the agent exists. Notably, if the WFE communication register 108 is unchanged, then the client considers the agent to be absent. Prior to issuing the WFE instruction, the client configures a client timer, such as a hypervisor generic timer 134 or a guest OS generic timer 124, to trigger an event after a maximum expected response time for the agent has passed. In this fashion, the client ensures that the CPU 103 does not deadlock on the WFE instruction, yet still provides enough time for any existing agent to convey existence by modifying WFE communications registers 108.

Advantageously, after detecting the existence of the agent, the client may "safely" communicate using conventional mechanisms (such as HVCs or SMCs). Further, the client may continue to employ WFE instructions, WFE communication registers 108, and predetermined communication sequences, to maintain a WFE-based communication channel between the client and the agent. Since such subsequent communications may safely rely on a response from the agent, ongoing communications do not require configuring client timers to prevent deadlocks.

Notably, since exchanging data via the WFE-based communication channel does not involve resource intensive operations (e.g., decoding or memory accesses), the WFE communication channel provides a more efficient communication mechanism than many conventional methods used to communicate between privilege levels. Accordingly, a wide variety of applications may leverage the WFE communication channel to streamline client access to agent facilities. One such application leverages watchdog capabilities included in the agent to provide WFE-based watchdog functionality to the client. A watchdog is a hardware or software timer that is used to detect and recover from computer malfunctions. Typically, a watchdog is designed to protect software and/or hardware from "hanging" and becoming unresponsive. Such an application is useful in a variety of situations and mixtures of agents and clients. For example, in some embodiments a hypervisor WFE-based watchdog 136 exposes watchdog facilities included in secure monitor 160 to hypervisor 130 in host computer systems 100 that do not include watchdog support in hardware. Further, a VM WFE-based watchdog 142 may be efficiently implemented by guest OS 122 using the WFE-based communication channel.

An exemplary host computer system 100 that provides the described hierarchical privilege levels includes an ARM®Cortex-A57 (based on the ARMv8 architecture) CPU 103. ARMv8 CPUs, including ARM®Cortex-A57, are commercially available from ARM Holdings of Cambridge, United Kingdom. It should be recognized that the techniques described herein are illustrative rather than restrictive.

It should be recognized that the various terms, layers and categorizations used to describe the virtualization components in FIG. 1 may be referred to differently without departing from their functionality or the spirit or scope of the invention. For example, virtual hardware platforms $122_1$-$122_N$ may be considered to be part of virtual machine monitors (VMM) $140_1$-$140_N$. Alternatively, virtual hardware platforms $122_1$-$122_N$ may be considered to be separate (e.g., as a component of its corresponding virtual machine since such platforms include the hardware emulation components for the virtual machine) from VMMs $140_1$-$140_N$, and VMMs $140_1$-$140_N$ may be considered to be separate from hypervisor 114. One example of hypervisor 114 that may be used is included as a component of VMware® vSphere™, which is commercially available from VMware, Inc. of Palo Alto, Calif. It should further be recognized that other virtualized computer systems are contemplated, such as hosted virtual machine systems, where the hypervisor is implemented in conjunction with a host operating system.

Figure 2:
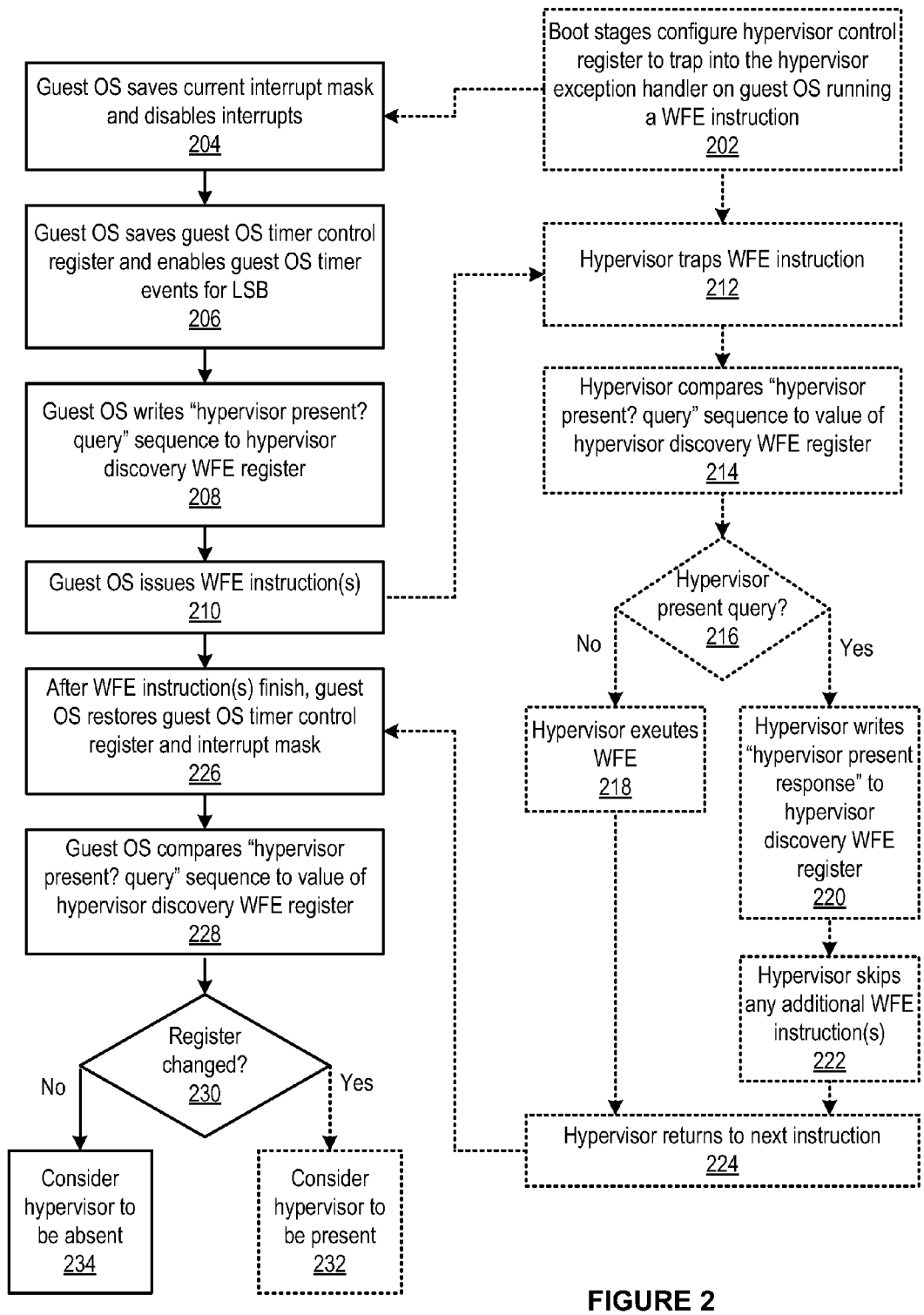
FIG. 2 depicts a flow diagram of method steps that employ a wait-for-event instruction to determine whether a hypervisor is present while running a guest operating system, according to one or more embodiments.

FIG. 2 depicts a flow diagram of method steps that employ a wait-for-event instruction to determine whether a hypervisor is present while running a guest operating system, according to one or more embodiments. Certain method steps are performed by hypervisor 130 (when hypervisor 130 is present) to enable guest OS 122 to detect the presence of hypervisor 130. Other method steps are performed by guest OS 122 irrespective of whether hypervisor 130 is present. For explanatory purposes, FIG. 2 illustrates method steps that hypervisor 130 performs (when present) using dotted-line boxes and arrows. By contrast, FIG. 2 illustrates method steps that guest OS 122 performs to detect the presence of hypervisor 130 as solid boxes and arrows.

Although FIG. 2 depicts a guest operating system detecting the presence of a hypervisor, such method steps may be generalized to any "application" detecting the presence of an "agent," where the agent is operating at a higher privilege level than the application. For instance, similar method steps may be used to enable a guest OS to detect the presence of a secure monitor and a hypervisor to detect the presence of a secure monitor.

If hypervisor 130 is present, then this method begins at step 202, where hypervisor 130 configures the CPU 103 to trap to hypervisor 130 when guest OS 122 issues a wait-for-event (WFE) instruction. Hypervisor 130 may be configured trap WFE instructions in any technically feasible fashion. In some embodiments, prior to CPU 103 running guest OS 122, hypervisor boot stages included in hypervisor 130 set a hypervisor control register to trap to hypervisor "exception handler" upon guest OS 122 issuing a WFE instruction. If hypervisor 130 is not present, then this method begins at step 204.

At step 204, guest OS 122 saves a current interrupt mask and then disables interrupts. Typically, the interrupt mask holds the settings for a read and write interrupt mask register that enables or masks interrupts from being triggered on interrupt pins included in CPU 103. By ensuring that interrupts do not occur and thereby satisfy WFE instructions, disabling interrupts prevents interrupts rendering WFE instructions untrappable by any existing hypervisor 130. Saving the current interrupt mask allows guest OS 122 to restore any previously enabled interrupts after this method completes.

In addition to ensuring that WFE instructions are trappable by hypervisor 130, guest OS 122 also ensures that guest OS 122 does not hang waiting for an event that never occurs (i.e., when there is no hypervisor 130 present). In general, guest OS 112 configures guest OS generic timer 124 to periodically generate "events." In some embodiments, guest OS saves a guest OS timer control register and then configures guest OS generic timer 124 to generate events based on the least significant bit (step 206). In alternate implementations, guest OS 122 may configure guest OS generic timer 124 to generate events in any technically feasible fashion that not only prevents deadlocks, but also reflects a maximum expected response time for any potential hypervisor 130. Saving the current guest OS timer control register enables guest OS to restore any previous periodic timer-generated events after this method completes.

At step 208, guest OS 122 writes a "hypervisor present? query" sequence to hypervisor discovery WFE register (included in WFE communication registers 108). "Hypervisor present? query" is any "special" sequence of values that is both known to hypervisor 130 and is unlikely to occur as part of normal execution flow. In alternate embodiments, hypervisor discovery WFE register may be replaced with any type and number of storage locations, such as a locations in system memory, that are accessible by both guest OS 122 and hypervisor 130. Further, any number of special sequences for communication between guest OS 122 and hypervisor 130 may be established in any fashion that enables consistent interpretation.

At step 210, guest OS 122 issues a WFE instruction. To ensure that any hypervisor 130 has an opportunity to receive a WFE instruction, guest OS 122 may issue a train of WFE instructions. In general, guest OS 122 issues a train that includes enough WFE instructions to absorb other, non CPU-timer, potential events, such as activity on other CPUs 103 in a symmetric multiprocessor system. In some embodiments, guest OS 122 communicates the number of WFE instructions included in the train to a potentially operating hypervisor 130, thereby enabling hypervisor 130 to process the first WFE instruction and then bypass the remaining WFE instructions and avoiding unnecessary latency. Guest OS 122 may communicate the length of the WFE instruction train in any technically feasible fashion that is "safe" irrespective of the presence of hypervisor 130, such as setting bits in a specified register.

If hypervisor 130 is present, then the WFE instruction(s) traps to hypervisor 130 (step 212), and hypervisor 130 performs steps 214-224. At step 214, hypervisor 130 compares the value of the hypervisor discovery WFE register to the "hypervisor present? query" sequence. At step 216, if hypervisor 130 determines that the sequences do not match, then hypervisor 130 considers that guest OS 122 is operating conventionally (i.e., not attempting to discover hypervisor 130), and this method proceeds to step 218. At step 218, hypervisor 130 emulates conventional WFE instruction behavior: hypervisor 130 waits for an event. Subsequently, this method proceeds directly to step 224, where hypervisor 130 returns control to guest OS 122.

If, at step 216, hypervisor 130 determines that the value of the hypervisor discovery WFE register matches the "hypervisor present? query" sequence, then hypervisor 130 considers that guest OS is attempting to discover hypervisor 130, and this method proceeds to step 220. At step 220, hypervisor 130 writes a "hypervisor present response" sequence to the hypervisor discovery WFE register—displacing the "hypervisor present? query." sequence. At step 222, hypervisor 130 skips any additional WFE instruction (s), and this method proceeds to step 224 where hypervisor 130 returns control to the next instruction included in guest OS 122.

If hypervisor 130 is not present, then hypervisor 130 does not perform steps 212-224. Instead, after issuing the WFE instruction(s) at step 210, guest OS generic timer 124 issues an event after the time interval specified in the guest OS timer register (set in step 206). Notably, the value of the hypervisor discovery WFE register is unchanged (i.e., equals the "hypervisor present? query" sequence). As is conventional, the WFE instruction finishes executing (step 224) upon receiving this event—preventing a "hang" when no hypervisor 130 is present. This method then proceeds to step 226.

At step 226, after the final WFE instruction finishes executing, guest OS 122 restores the guest OS timer control register (saved at step 206) and the interrupt mask (saved at step 204). At step 228, guest OS 122 compares the "hypervisor present? query" sequence to the current value of hypervisor discovery WFE register. If, at step 230, guest OS 122 determines that the value of hypervisor discovery WFE register is unchanged (i.e., matches the "hypervisor present? query" sequence), then guest OS 122 infers that the WFE was terminated based on an event generated by guest OS generic timer 124. Because guest OS 122 configured guest OS generic timer 124 to issue an event only after a maximum expected length of time for any existing hypervisor to respond, guest OS 122 concludes that no hypervisor exists (step 234), and this method terminates.

At step 230, if guest OS 122 determines that the value of hypervisor discovery WFE register no longer matches the "hypervisor present? query" sequence, then the guest OS 122 infers that hypervisor 130 trapped the WFE instructions and modified the hypervisor discovery WFE register. Consequently, guest OS 122 concludes that hypervisor 130 is present (step 232). In some embodiments, guest OS 122 reads the value of the hypervisor discovery WFE register to obtain additional information, such as the type of hypervisor. Having successfully detected the presence of hypervisor 130 in a non-destructive manner, this method terminates.

In alternate embodiments, guest OS 122 and hypervisor 130 may be configured to communicate via any number of storage elements using any consistent method of interpreting the values in the selected storage elements. For example, in some embodiments, guest OS 122 is configured to write a "hypervisor present? query" to a "query" register. In response, hypervisor 130 is configured to write a "hypervisor present response" sequence to a "response" register and hypervisor type-identification information to a "response details" register. Subsequently, guest OS 122 reads the "response" register to determine whether hypervisor 130 is present, and then reads the "response details" register to determine the type of hypervisor 130.

After establishing that an "agent" is present, a "client" may issue appropriate calls, secure that the calls will be received without risking a crash. For instance, guest OS 124 may determine that hypervisor 130 exists, and then use hypervisor calls to communicate with hypervisor 130. Similarly, hypervisor 130 may determine that secure monitor 160 exists, and then use secure monitor calls to communicate with secure monitor 160.

Notably, the steps of configuring a WFE instruction issued by the client to trap to the agent, initiating transmissions from client to agent using WFE instructions, and exchanging data using WFE communication registers 108 may be generalized to enable any type of communication between client and agent. In some embodiments, the client and the agent may continue to communicate via the WFE-based communication channel after the client establishes the WFE-based communication channel as part of verifying the existence of the agent. In alternate embodiments, the client may determine that the agent exists in any technically feasible fashion (or assume that the agent exists) and establish the WFE-based communication channel for the purpose of exchanging data, not discovering the agent.

In general, any client may leverage the WFE-based communication channel in conjunction with any agent to enable a wide variety of functionality. In some embodiments, guest OS 122 leverages watchdog facilities provided by hypervisor 130 to establish VM WFE-based watchdog 126. In other embodiments, hypervisor 130 leverages watchdog facilities provided by secure monitor 160 to establish hypervisor WFE-based watchdog 136.

Figure 3:
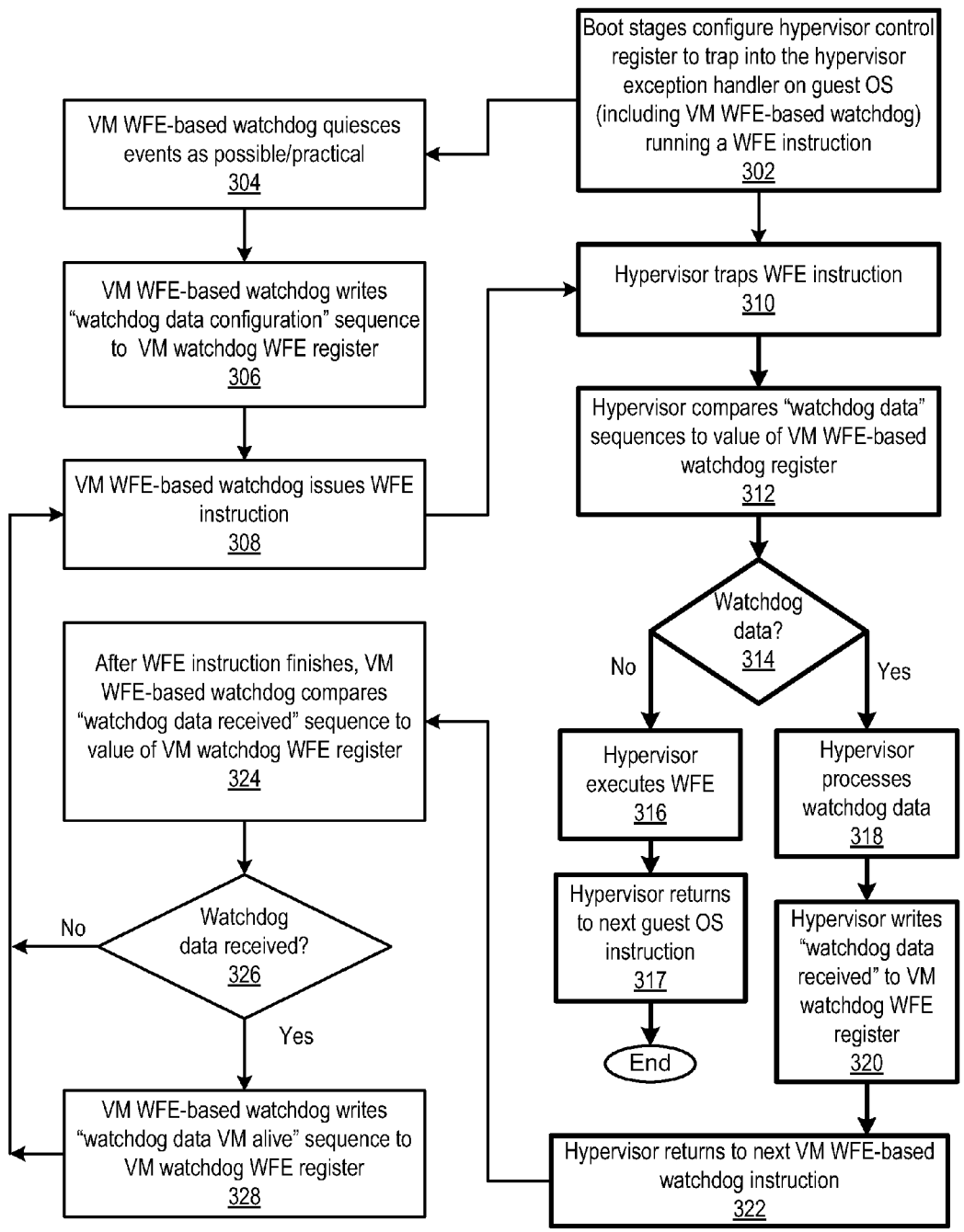
FIG. 3 depicts a flow diagram of method steps that employ a wait-for-event instruction to provide watchdog functionality for a virtual machine, according to one or more embodiments.

FIG. 3 depicts a flow diagram of method steps that employ a wait-for-event instruction to provide watchdog functionality for a virtual machine, according to one or more embodiments. Certain method steps are performed by VM WFE-based watchdog 126, while other method steps are performed by hypervisor 130 to enable VM WFE-based watchdog 126 to access watchdog facilities included in hypervisor 130. For explanatory purposes, FIG. 3 illustrates method steps that hypervisor 130 performs using thick-line boxes, and method steps that VM WFE-based watchdog 126 performs using thin-line boxes.

Although FIG. 3 depicts guest OS 122 creating a VM watching using watchdog facilities included in hypervisor 130, such method steps may be generalized to any "client" leveraging watchdog facilities included in any "agent" that is operating at a more privileged privilege level than the client. For instance, similar method steps may be used to enable guest OS 122 or hypervisor 120 to use watchdog facilities included in secure monitor 160 to create a watchdog for the client.

This method begins at step 302, where hypervisor 130 configures CPU 103 to trap to hypervisor 130 when guest OS 122 (including VM WFE-based watchdog 126) issues a wait-for-event (WFE) instruction. Hypervisor 130 may be configured trap WFE instructions in any technically feasible fashion. In some embodiments, prior to CPU 103 running guest OS 122, hypervisor boot stages included in hypervisor 130 set a hypervisor control register to trap to hypervisor "exception handler" upon guest OS 122 issuing a WFE instruction.

At step 304, VM WFE-based watchdog 126 quiesces as many events as possible and/or practical. Such events may include, among other things, unmasked interrupts, certain activity on other CPUs 103 in a symmetrical multiprocessor configuration, and events generated by guest OS generic timer 124. Although reducing generated events may optimize performance of VM WFE-based watchdog 126, some embodiments do not perform step 304 yet still implement VM WFE-based watchdog 126 effectively. Further, because guest OS 122 has already determined that hypervisor 130 exists (e.g., using the method steps of FIG. 2), VM WFE-based watchdog 126 does not include any algorithms to prevent hanging when hypervisor 130 is not present.

At step 306, VM WFE-based watchdog 126 writes a "watchdog data configuration" sequence to a "VM watchdog WFE register" (included in WFE communication registers 108). "Watchdog data configuration" is any "special" sequence of values that is known to hypervisor 130 and is unlikely to occur as part of normal (i.e., not as part of implementing VM WFE-based watchdog 126) execution flow. In alternate embodiments, VM watchdog WFE register may be replaced with any type and number of storage locations, such as a locations in system memory, that are accessible by both guest OS 122 and hypervisor 130. Further, any number of special sequences for communication between VM WFE-based watchdog 126 and hypervisor 130 may be established in any fashion that enables consistent interpretation.

At step 308, VM WFE-based watchdog 126 issues a WFE instruction and the WFE instruction(s) traps to hypervisor 130 (step 310). At step 312, hypervisor 130 compares the value of the VM watchdog WFE register to one or more "watchdog data" sequences, including "watchdog data configuration" and "watchdog data VM alive" sequences. At step 314, if hypervisor 130 determines that the value of the VM watchdog WFE register does not match any valid "watchdog data" sequences, then hypervisor 130 considers that guest OS 122 is operating conventionally, not as VM WFE-based watchdog 126, and this method proceeds to step 316. At step 316, hypervisor 130 emulates conventional WFE instruction behavior: hypervisor 130 waits for an event. Subsequently, hypervisor 130 returns control to guest OS 122 (step 317) and this method ends.

If at step 314, hypervisor 130 determines that the value of the VM watchdog WFE register matches a valid "watchdog data" sequence, then hypervisor 130 considers that guest OS 122 is operating as VM WFE-based watchdog 126, and this method proceeds directly to step 318. At step 318, hypervisor 130 processes the watchdog data sequence included in the VM watchdog WFE register. More specifically, since the matching watchdog data sequence corresponds to a configuration sequence (set in step 306), hypervisor 130 configures watchdog facilities included in hypervisor 130 based on the configuration sequence. For instance, in some embodiments, hypervisor 130 configures a callback for hypervisor generic timer 134 to perform a system reset or other activity defined by the configuration sequence.

Notably, as VM WFE-based watchdog 126 continues to operate, VM WFE-based watchdog 126 may set the value of the VM watchdog WFE register to other valid "watchdog data" sequences, such as a "watchdog data VM alive" sequence. In general, at step 318, hypervisor 130 processes the watchdog data sequence included in VM watchdog WFE register based on a pre-determined interpretation that is consistent across both hypervisor 130 and VM WFE-based watchdog 126.

After processing the watchdog data sequence, this method proceeds to step 320, where hypervisor 130 writes a "watchdog data received" sequence to the VM watchdog WFE register. The "watchdog data received" sequence conveys that hypervisor 130 successfully interpreted and processed the watchdog data sequence previously included in the VM watchdog WFE register. At step 322, hypervisor 130 returns to the next instruction included in VM WFE-based watchdog 126.

At step 324, VM WFE-based watchdog 126 resumes executing instructions. In particular, VM WFE-based watchdog 126 compares the value of the VM watchdog register to the "watchdog data received" sequence. If, at step 326, VM WFE-based watchdog 126 determines that the value of the VM watchdog register does not match the "watchdog data received" sequence, then VM WFE-based watchdog 126 infers that the WFE completed based on an unrelated event instead of trapping to hypervisor 130. Because VM WFE-based watchdog 126 has established that hypervisor 130 exists, VM WFE-based watchdog 126 returns to step 308, where VM WFE-based watchdog 126 issues another WFE instruction. VM WFE-based watchdog 126 and hypervisor 130 continue to execute steps 308-326 until hypervisor 130 processes and acknowledges the watchdog data configuration sequence stored in the VM watchdog WFE register (at 306).

If, at step 326, VM WFE-based watchdog 126 determines that the value of the VM watchdog register matches the "watchdog data received" sequence, then VM WFE-based watchdog 126 infers that the WFE trapped to hypervisor 130 and hypervisor 130 configured the watchdog facilities included in hypervisor 130. At step 328, to ensure that the watchdog facilities included in hypervisor 130 do not trigger a reset while VM 120 is still alive, VM WFE-based watchdog 126 "kicks" the watchdog facilities included in hypervisor 130—conveying that VM 120 is alive. In particular, VM WFE-based watchdog 126 writes a watchdog data alive sequence to the VM watchdog WFE register and then returns to step 308, where VM WFE-based watchdog 126 issues another WFE instruction and hypervisor 130 relays the "kick" to watchdog facilities included in hypervisor 130 (step 318). VM WFE-based watchdog 126 and hypervisor 130 continue to execute steps 308-328, periodically "kicking" the VM WFE-based watchdog 126 until VM 120 terminates.

In alternate embodiments, VM WFE-based watchdog 126 and hypervisor 130 may be configured to communicate via any number of storage elements using any consistent method of interpreting the values in the selected storage elements. For example, in some embodiments, VM WFE-based watchdog 126 is configured to write the watchdog data configuration sequence to a "watchdog configuration" register. In response, hypervisor 130 is configured to write the watchdog data received sequence to a "watchdog response" register. Periodically, VM WFE-based watchdog 126 writes watchdog data VM alive sequences to a "watchdog alive" register, and hypervisor 130 responds by writing the watchdog data received sequence to a "watchdog alive acknowledged" register.

Advantageously, because WFE-based watchdogs are capable of identifying which CPU 103 is communicating, a multi-CPU WFE-based watchdog may be used to ensure liveliness in a multiple-CPU system. Further, since WFE-based watchdogs are implemented in software (not hardware), WFE-based watchdogs may perform advanced actions, such as providing extensive diagnostics, upon detecting watchdog violations.

Figure 4:
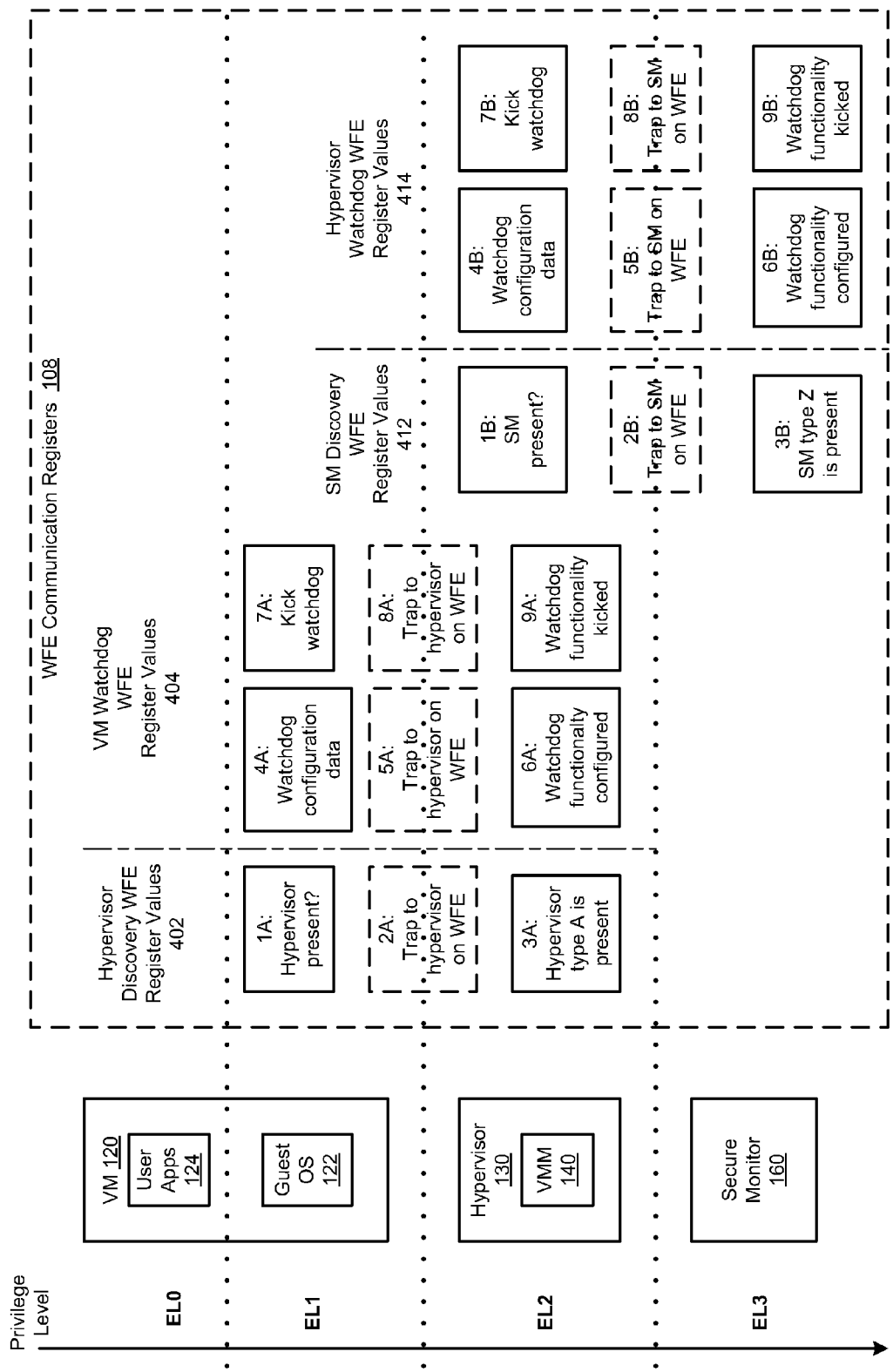
FIG. 4 is a conceptual diagram that illustrates transmissions and responses via the communication channel, according to one or more embodiments.

FIG. 4 is a conceptual diagram that illustrates transmissions and responses via the communication channel, according to one or more embodiments. As shown, user applications 124 are executing within VM 120 at the lowest privilege level EL0 and guest OS 122 is executing within VM 120 at privilege level EL1. Hypervisor 130 is operating at privilege level EL2, and secure monitor 160 is operating at the highest privilege level EL3.

The transmissions and responses via the communication channel are represented by the values of WFE communication registers 108 over time. FIG. 4 depicts two separate timelines: timeline "A" in which the client is guest OS 122 and the agent is hypervisor 130 and timeline "B" in which the client is hyperivsor 130 and the agent is secure monitor 160. For explanatory purposes, each value of WFE communications registers 108 and each WFE trap is annotated with a sequential abstracted time.

As shown, timeline "A" indicates that guest OS 122 stores a "hypervisor present?" sequence as a hypervisor discovery WFE register value 402 (at time "1A"). Guest OS 122 then issues a WFE instruction and hyperivsor 130 traps the WFE instruction (at time "2A"). Hypervisor 130 stores a "hypervisor type A is present" sequence as hypervisor discovery WFE register value 402 (at time "3A"), and guest OS 122 concludes that hypervisor 130 is present.

After verifying the existence of hypervisor 130, guest OS 122 stores a "watchdog configuration data" sequence as a VM watchdog WFE register value 404 (at time "4A"). Guest OS 122 then issues a WFE instruction and hyperivsor 130 traps the WFE instruction (at time "5A"). Hypervisor 130 stores a "watchdog functionality configured" sequence as VM watchdog WFE register value 404 (at time "6A"), and guest OS 122 concludes that the VM watchdog is enabled. Guest OS 122 is configured to periodically "kick" the VM watchdog—preventing false watchdog violations while VM 120 is active. An exemplary "kick" communication is shown as occurring at times "7A" through "9A."

In a similar fashion, path "B" indicates the changes in SM discovery WFE register values 412 and hypervisor watchdog WFE register values 414 at times "1B" through "9B." More specifically, during time "1B" through "3B," hypervisor 130 discovers the present of SM 160. During time "4B" through "6B" hypervisor 130 configures a hypervisor watchdog, and during time "7B" through "9B," hypervisor 130 "kicks" the hypervisor watchdog.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. In a computer system operating at an agent privilege level, a method of communicating with a client operating at a client privilege level that is at a lower privilege level than the agent privilege level, comprising:
    setting a control register to trap wait-for-event instructions that are generated by the client;
    trapping a wait-for-event instruction based on the control register; and
    upon trapping the wait-for-event instruction, reading a value stored in a first memory component, determining, by a hardware processor, whether the stored value matches one of a number of predefined values, if the stored value matches a predefined value indicating that the client is using the wait-for-event instruction to detect presence of the agent, then skipping the wait-for-event instruction and executing one or more instructions causing a response to be stored in a second memory component that is accessible to the client to indicate that the agent is present, and
    returning execution control to the client.

2. The method of claim 1, wherein the wait-for-event instruction is executed if the stored value does not match any of the predefined values.

3. The method of claim 1, further comprising
    if the stored value matches a predefined value indicating that the client is using the wait-for-event instruction to request watchdog functionality, then skipping the wait-for-event instruction and executing one or more instructions causing the watchdog functionality to be configured according to additional values stored in the first memory component and causing a response to be stored in a second memory component that is accessible to the client to acknowledge the request for the watchdog functionality.

4. The method of claim 1, wherein the first memory component is a register.

5. The method of claim 1, wherein the first memory component is a predetermined location in a system memory.

6. The method of claim 1, wherein the client is a virtual machine and the agent is one of a hypervisor and a secure monitor.

7. The method of claim 1, wherein the client is a hypervisor and the agent is a secure monitor.

8. A non-transitory computer-readable storage medium comprising instructions which, when executed in a computer system operating at an agent privilege level, cause the computer system to communicate with a client operating at a client privilege level that is at a lower privilege level than the agent privilege level by performing the steps of:
    setting a control register to trap wait-for-event instructions that are generated by the client;
    trapping a wait-for-event instruction based on the control register; and
    upon trapping the wait-for-event instruction, reading a value stored in a first memory component, determining, by a hardware processor, whether the stored value matches one of a number of predefined values, if the stored value matches a predefined value indicating that the client is using the wait-for-event instruction to detect presence of the agent, then skipping the wait-for-event instruction and executing one or more instructions causing a response to be stored in a second memory component that is accessible to the client to indicate that the agent is present, and
    returning execution control to the client.

9. The non-transitory computer-readable storage medium of claim 8, wherein the wait-for-event instruction is executed if the stored value does not match any of the predefined values.

10. The non-transitory computer-readable storage medium of claim 8, wherein if the stored value matches a predefined value indicating that the client is using the wait-for-event instruction to request watchdog functionality, then skipping the wait-for-event instruction and executing one or more instructions causing the watchdog functionality to be configured according to additional values stored in the first memory component and causing a response to be stored in a second memory component that is accessible to the client to acknowledge the request for the watchdog functionality.

11. A computer system comprising:
    a hardware processor;
    a client that operates therein at a client privilege level; and
    an agent that operates therein at an agent privilege level that is at a higher privilege level than the client privilege level and is configured to:
    set a control register to trap wait-for-event instructions that are generated by the client;
    trap a wait-for-event instruction based on the control register; and
    upon trapping the wait-for-event instruction, read a value stored in a first memory component, determining, by the hardware processor, whether a stored value matches one of a number of predefined values, if the stored value matches a predefined value indicating that the client is using the wait-for-event instruction to detect the presence of the agent, then skip the wait-for-event instruction and execute one or more instructions causing a response to be stored in a second memory component that is accessible to the client to indicate that the agent is present, and return execution control to the client.

12. The computer system of claim 11, wherein the first memory component is a register.

13. The computer system of claim 11, wherein the client is a virtual machine and the agent is one of a hypervisor and a secure monitor.

14. The computer system of claim 11, wherein the client is a hypervisor and the agent is a secure monitor.

* * * * *